United States Patent [19]

Lastra

[11] Patent Number: 5,030,306

[45] Date of Patent: Jul. 9, 1991

[54] MACHINE FOR LABELING CONTAINERS HAVING CHIMES

[76] Inventor: George P. Lastra, 2801 Tully Rd. #D, Modesto, Calif. 95350

[21] Appl. No.: 467,800

[22] Filed: Jan. 17, 1990

[51] Int. Cl.$^5$ ............................................... B65C 3/00
[52] U.S. Cl. .................................. 156/215; 156/447; 156/475; 156/488; 156/581
[58] Field of Search ............... 156/86, 212, 213, 215, 156/447, 448, 449, 456, 457, 458, 475, 488, 581, 566

[56] References Cited

U.S. PATENT DOCUMENTS 4,740,256  4/1988  Vosberg ........................ 156/555 X

*Primary Examiner*—David A. Simmons
*Assistant Examiner*—James J. Engel, Jr.

[57] ABSTRACT

Machine and method for applying plastic labels and the like to containers, e.g. metal coffee cans, which have chimes or reinforcement grooves, in which the containers, after application of a plastic label, is caused to pass between a roll down pad and a belt, the roll down pad having a rib for each chime and or groove. The ribs are heated to improve the effectiveness of labeling.

11 Claims, 2 Drawing Sheets

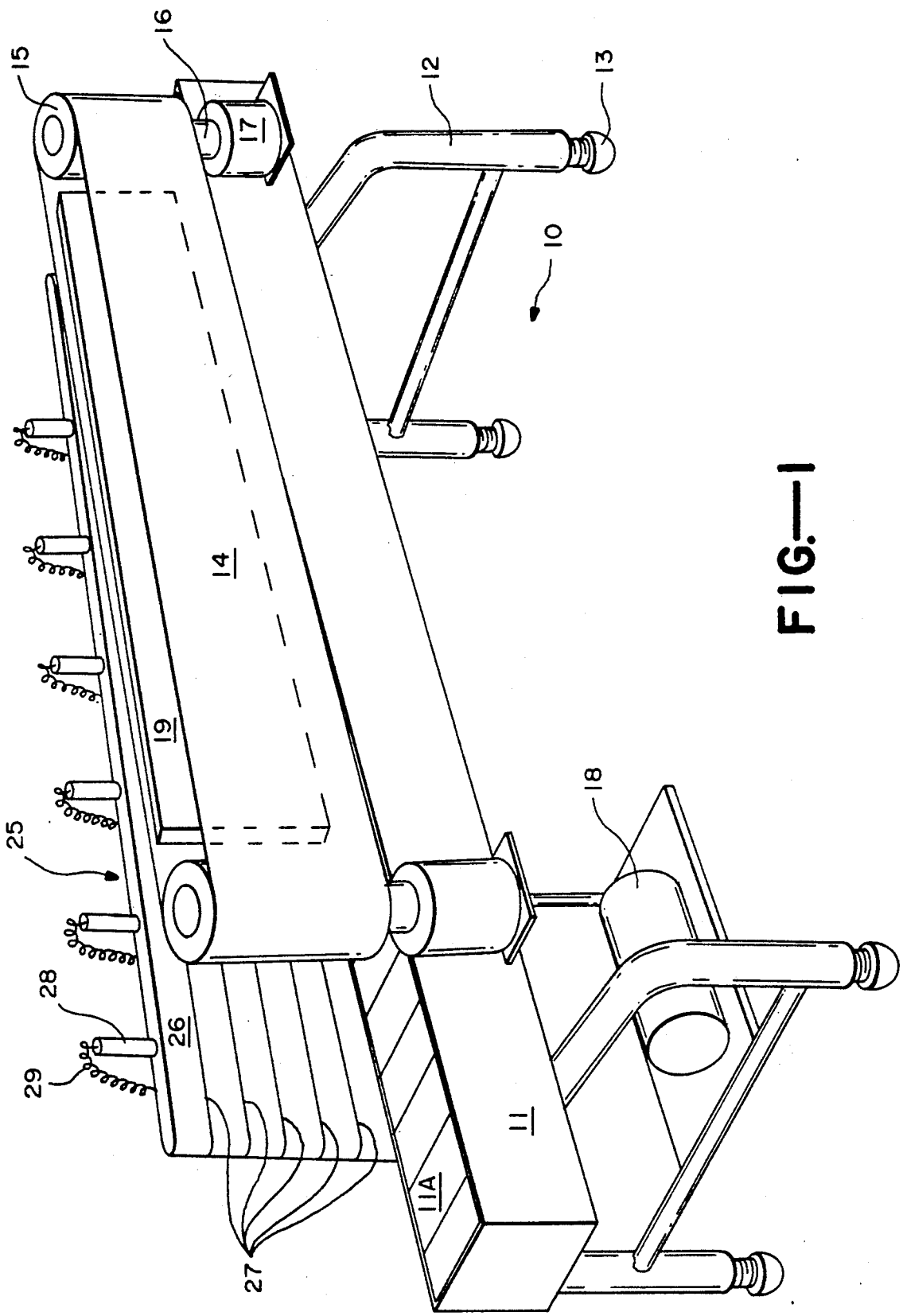
FIG.—1

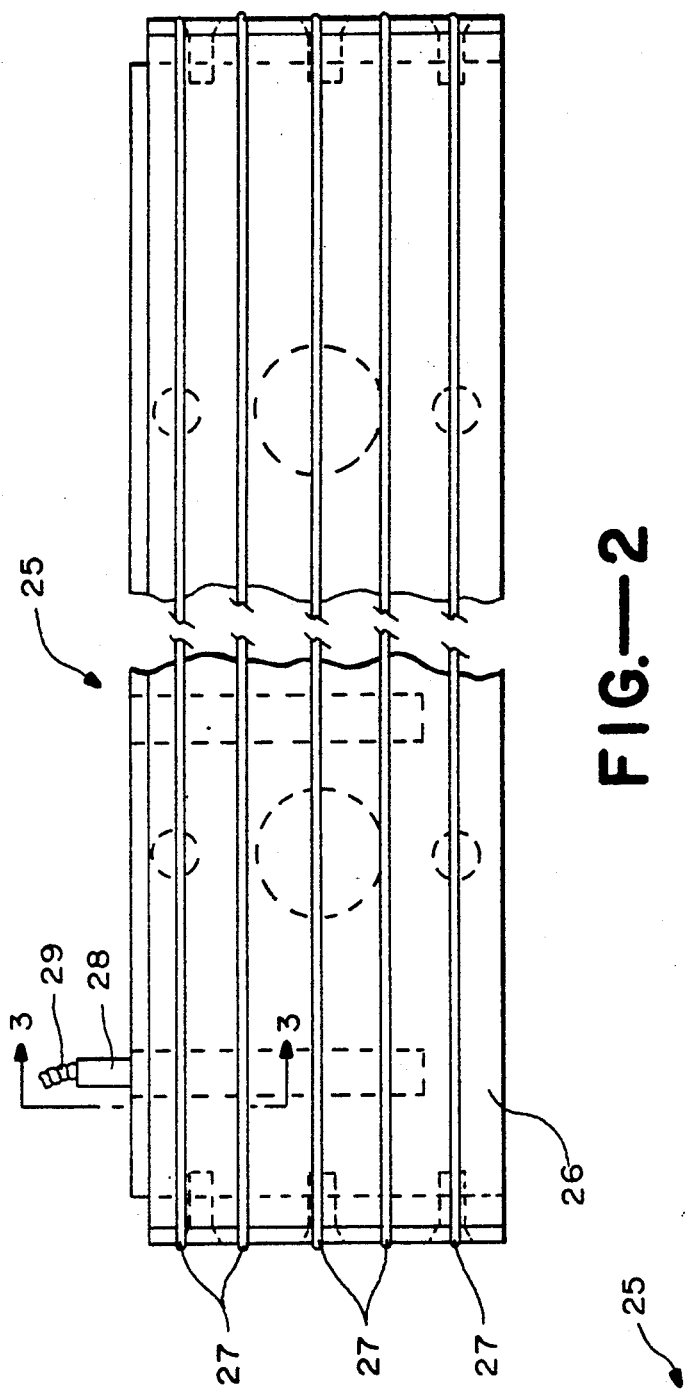
FIG.—2
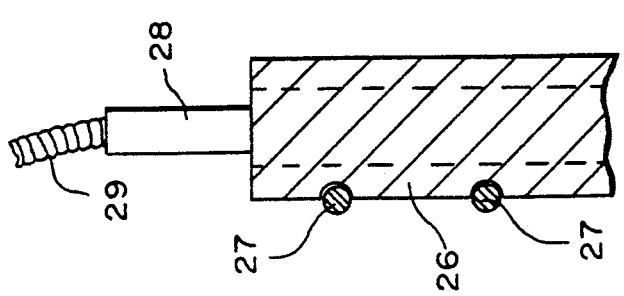
FIG.—3

MACHINE FOR LABELING CONTAINERS HAVING CHIMES

FIELD OF THE INVENTION

This invention relates to a machine for applying labels to containers such as coffee cans which are cylindrical but have circumferential grooves, for example chimes at the upper and lower ends where the metal of the container slopes inwardly, also circumferential grooves between the top and bottom of the container intended to reinforce the metal.

BACKGROUND OF THE INVENTION

It is advantageous to apply labels of plastic film material to such containers. For example, plastic film such as polypropylene, polyethylene, polyvinyl chloride and polyethylene-polypropylene laminates are waterproof and present a better appearance more nearly resembling lithograph labels than paper labels.

However plastic labels are difficult to apply properly to the chimes and other circumferential grooves. If heat is applied by an oven to shrink the plastic into the grooves the heating equipment is bulky and costly to build and is expensive to operate. Moreover the results have not been favorable. For example the plastic film material shrinks in the transverse direction, i.e. in a direction perpendicular to the line of flow of the containers through a labeling machine.

SUMMARY OF THE INVENTION

It is a object of the invention to provide a method and equipment capable of applying plastic labels to such containers whereby the plastic labels are properly applied to chimes and other circumferential grooves.

The above and other objects of the invention will be apparent from the ensuing description and the appended claims.

In the practice of the invention, after a label has been applied to a cylindrical container such as, for example, a coffee can having chimes and/or circumferential grooves the container is caused to travel along what is called a roll down pad and it is compressed between such pad and a belt. The pad and belt act to spin the container which results in wrapping the label around the container (or completing such wrapping if it has been started by a turret and associated roll down element such as in U.S. Pat. No. 4,108,709 or by vacuum drum/roll on pad as in U.S. Pat. No. 4,500,386). This is conventional practice which, however, is modified in accordance with the present invention by providing a projecting element, referred to hereinafter as a "rib" or ribs on the roll down pad which is (or are) so located as to register with the circumferential groove or grooves in the container. By this means the plastic label is pressed into the groove or grooves.

At the same time the rib or ribs are heated. This heating in conjunction with the mechanical pressure of the rib or ribs has the effect of stretching the plastic film and causing it to enter the groove or grooves and of shrinking the plastic so it will not only enter but on cooling will remain in the groove or grooves.

BRIEF DESCRIPTION OF THE DRAWINGS

The invention is illustrated by way of example in the accompanying drawings, in which:

FIG. 1 is a perspective view of that part of a labeling machine which embodies the present invention;

FIG. 2 is a view in elevation of the inner face of the roll down pad of FIG. 1; and FIG. 3 is a section along the line 3—3 of FIG. 2.

DETAILED DESCRIPTION OF A PREFERRED EMBODIMENT

Referring now to FIG. 1, the roll down portion 10 of a labeling machine is shown which serves to receive labeled containers at its righthand end and to firmly apply labels to the containers and to deliver them to the lefthand end, as viewed in FIG. 1. Upstream (that is to the right as viewed in FIG. 1) is provided a label applying element (not shown) such as the turret type of labeling machine of U.S. Pat. No. 4,108,709 or a vacuum drum/roll on pad machine as in U.S. Pat. No. 4,500,386 or other suitable equipment.

The machine 10 includes a conveyor 11 for transporting the containers, legs 12 with adjustable feet 13 and a drive belt 14. The conveyor 11 is shown diagrammatically and it may be driven by any suitable means to move belt 11A on which containers are supported and moved. The belt 14 is trained about rollers 15 on shafts 16 mounted in bearings 17, one of which is driven by a motor 18. A deadplate 19 suitably supported on the frame of the machine is provided on the inside face of the belt to provide a firm lateral support for the belt and the containers.

Opposite, and suitably spaced from the inner portion of the belt is a roll down pad 25 which may be of aluminum or other suitable material. Each container as it passes between the belt 14 and the roll down pad 25 is squeezed sufficiently that the belt 14 will cause it to spin, thus completing any wrapping of the label about the container that may be necessary and causing the wrapped label to adhere firmly and uniformly to the container. The roll down pad 25 is suitably mounted on the frame of the machine by means which permit it to be removed and replaced by another such pad and which also permits adjusting the height of the pad and its spacing from the belt 14. Such changes of the pad 25 may be needed for different containers, for example for shorter or longer containers and for containers of greater or lesser diameter. Adjustments up or down and nearer to or further from the belt 14 enable one to make fine adjustments. Such mounting means are well known in the art and require no further description herein.

The roll down pad 25 has an inner face 26 which is equipped with one or more ribs 27 which are horizontal and are suitably fixed to the pad, for example by milling grooves in the pad and inserting the ribs. The number of ribs 27 will depend upon the configuration of the container. In the example shown, there are five ribs, one at the top for an upper chime of a container, one at the bottom for the bottom chime and three in between for three circumferential reinforcement grooves. The spacing and position of the ribs 27 will, of course, depend upon the particular containers, being located to register with the chimes and circumferential grooves of the containers. The ribs will also be of a diameter to fit within the chimes and circumferential grooves and will project sufficiently to accomplish their intended function, which is to press the plastic label into the chimes and grooves.

Heat is applied to the cords 27 as by heating the entire pad 25 electrically to heat the cords in turn by conduction or, preferably, by making the cords electrically conductive and heating them electrically. To that end, tubes 28 are provided which penetrate the pad 25 at intervals and which carry electrical wires 29. The electrical connections are to the body of the pad 25 for conductive heating or directly to the cords 27 for electric heating of the cords.

A preferred material for the cords 27 is a rubber product known as Viton which is a trademark of E. I. duPont Company and is well known in this field as, for example, the outer cover for vacuum drums used in labeling machines as shown in the '709 and '386 Patents mentioned above. It is hard enough to push the plastic label material into the chimes and grooves but not so hard as to damage the plastic or the containers. It may be made conductive by coating it with silicon or other suitable conductive material. This material also has the advantage that it generates enough friction with the containers to cause them to spin as they move with the conveyor.

The temperature to which the ribs 27 are heated will depend upon the residence time of containers during transit between pad 25 and belt 14 (which in turn will depend upon the length and speed of the machine), upon the size and material of the container and upon the nature of the plastic labels. It has been found that with polypropylene labels a cord temperature of about 250° to 300° F. is suitable.

The chimes and grooves of containers such as coffee cans are generally quite uniform so that the spacing of the ribs 27 can be predetermined to close tolerances.

Regarding plastic label material, examples are provided above and are used of a grade recommended for labeling. The label material may be what is commonly called heat shrink material which may be preformed into tubes and applied to and heat shrunk onto containers; or it may be a heat shrink material which is applied directly to containers as in U.S. Pat. No. 4,704,173; or the label may be what is regarded as non-heat shrink material such as polypropylene which however, in practice, shrinks upon being heated and pressed into chimes and grooves. It is an advantage of the invention that such shrinkage is inward toward the material of the containers rather than in the direction of the axis of the container, e.g. vertically in FIG. 1. Vertical shrinkage is undesirable because it leaves bare metal and is unsightly.

It will therefore be apparent that a novel and useful labeling machine and method have been provided.

I claim:

1. In a machine for applying segments of film to cylindrical articles each having at least one circumferential groove, each such segment having a leading end and a trailing end, such machine including means for continuously applying and adhering the leading ends of such segments to the cylinder surfaces of a succession of such articles and for wrapping each segment, after such application, around the cylinder surface of each container and adhering the trailing end of the segment to the cylinder surface of the container, the improvement which comprises:
    (a) roll down means for securing each segment to the cylinder surface of its article, such roll down means including (1) means adapted to contact the articles on one side and (2) a stationary pad having a generally planer inner surface parallel to and spaced from said means (1) and adapted to compress the articles in the space between the pad and the means (1), said pad having a rib for each such circumferential groove, each such rib being so positioned, of a width and projecting from the planar surface of the pad a distance such that it will apply pressure to the film and force it into said groove or grooves.

2. The improvement of claim 1 wherein said means (1) is a belt.

3. The improvement of claim 2 wherein heating means is provided to heat each such rib to thereby heat the film and assist in the uniform insertion and permanence of the film in such groove.

4. The improvement of claim 3 wherein the stationary pad is of electrically conductive material and is heated electrically to heat the rib or ribs by conduction.

5. The improvement of claim 3 wherein the rib or ribs comprise electrically conductive material and is or are heated electrically.

6. The improvement of any of claims 1 to 5 in which the cylindrical articles are metal containers and the film segments are plastic labels.

7. A method of applying film segments to the cylinder surfaces of cylindrical articles each having at least one circumferential groove about its cylinder surface wherein such articles are caused to move to and through a segment applying station and segments are applied in sequence to the cylinder surfaces of the articles at such station, the applied segments are then wrapped around the article by spinning the article, said method also including the steps of:
    (a) causing the articles with segments wrapped around them to travel along a path
    (b) spinning each article about its cylinder axis as it so travels and
    (c) pressing each container during such travel and spinning against a solid surface provided with a projecting rib for each circumferential groove
thereby pressing such film segments into each such groove.

8. The method of claim 7 in which each such rib is heated to assist in pressing step (c).

9. The method of claim 8 wherein such heating is accomplished by electrical heating of said solid surface and by conduction therefrom to the rib or ribs.

10. The method of claim 8 wherein such heating is accomplished by electrical heating of the rib or ribs.

11. The method of any of claims 7 to 10 in which the cylindrical articles are metal containers and the segments of film material are plastic labels.

* * * * *